United States Patent
Webb et al.

(10) Patent No.: US 9,560,675 B2
(45) Date of Patent: Jan. 31, 2017

(54) INTERFERENCE MEASUREMENT IN HETEROGENEOUS NETWORKS

(71) Applicant: FUJITSU LIMITED, Kawasaki-shi, Kanagawa (JP)

(72) Inventors: Matthew Webb, Hayes Middlesex (GB); Zhaojun Li, Guildford (GB); Paul Bucknell, Brighton (GB); Timothy Moulsley, Surrey (GB)

(73) Assignee: FUJITSU LIMITED, Kawasaki (JP)

( * ) Notice: Subject to any disclaimer, the term of this patent is extended or adjusted under 35 U.S.C. 154(b) by 885 days.

(21) Appl. No.: 13/866,629

(22) Filed: Apr. 19, 2013

(65) Prior Publication Data

US 2013/0279412 A1    Oct. 24, 2013

(30) Foreign Application Priority Data

Apr. 20, 2012  (EP) .................................... 12164891

(51) Int. Cl.
*H04W 74/08* (2009.01)
*H04W 74/00* (2009.01)
(Continued)

(52) U.S. Cl.
CPC ......... *H04W 74/0833* (2013.01); *H04W 24/08* (2013.01); *H04W 74/006* (2013.01); *H04W 84/045* (2013.01)

(58) Field of Classification Search
CPC ............. H04W 74/0833; H04W 24/08; H04W 74/006; H04W 84/045
See application file for complete search history.

(56) References Cited

U.S. PATENT DOCUMENTS

2008/0139214 A1*  6/2008  Sun ..................... H04W 72/042
                                                     455/450
2009/0156194 A1    6/2009  Meylan
(Continued)

FOREIGN PATENT DOCUMENTS

WO    WO 2010/104977 A1    9/2010
WO    WO 2011/074865 A2    6/2011

OTHER PUBLICATIONS

ETSI TS 136 321, Evolved Universal Terrestrial Radio Access (E-UTRA); Medium Access Control (MAC) Protocol Specification (3GPP TS 36.321 version 10.0.0 Release 10).
(Continued)

*Primary Examiner* — Andrew Lai
*Assistant Examiner* — Zhiren Qin
(74) *Attorney, Agent, or Firm* — Arent Fox LLP

(57) ABSTRACT

In a heterogeneous network based on LTE, the random access, RA, procedure triggered in a macrocell produces transmissions from a UE (20) on the physical random access channel, PRACH, which a picocell eNB (12) can attempt to make measurements of for interference coordination purposes over the X2 interface between the macro eNB (10) and the pico eNB (12). By reconfiguring the UE's behavior during principally the contention-free RA procedure, its transmissions on PRACH are made different to the default such as to be suitable for heterogeneous network interference measurements. This is done by assigning new meanings to certain of the characteristic parameters provided by the macro eNB (10) to the UE (20), such as the RA preamble it uses and the C-RNTI it is assigned during the procedure. Interpreting these new meanings allows the UE (20) to temporarily re-configure its PRACH transmissions so as to be useful to the pico eNB's (12) interference measurement needs without disrupting the UE's existing configuration (Continued)

within the macrocell, and without the UE needing to know the purpose of its transmissions.

14 Claims, 3 Drawing Sheets

(51) Int. Cl.
*H04W 24/08* (2009.01)
*H04W 84/04* (2009.01)

(56) References Cited

U.S. PATENT DOCUMENTS

| | | | | |
|---|---|---|---|---|
| 2009/0305693 | A1* | 12/2009 | Shimomura | H04W 74/004 455/422.1 |
| 2010/0103889 | A1* | 4/2010 | Kim | H04W 74/004 370/329 |
| 2010/0195640 | A1* | 8/2010 | Park | H04W 56/0005 370/350 |
| 2010/0238859 | A1* | 9/2010 | Vukovic | H04W 74/0833 370/328 |
| 2010/0255844 | A1 | 10/2010 | Fischer et al. | |
| 2011/0250913 | A1 | 10/2011 | Vajapeyam et al. | |
| 2013/0064226 | A1* | 3/2013 | Dinan | H04W 36/30 370/332 |
| 2013/0201966 | A1* | 8/2013 | Weng | H04W 72/04 370/336 |
| 2013/0279412 | A1* | 10/2013 | Webb | H04W 74/0833 370/328 |

OTHER PUBLICATIONS

Extended European Search Report dated Oct. 5, 2012.
R3-120663, "Preamble-Based Solution for CA_HetNet_ICIC Macro-Pico UL Interference Scenario", Kyocera Corp, Mar. 26-30, 2012.

* cited by examiner

*Downlink*          *Uplink*

INTERFERENCE MEASUREMENT IN HETEROGENEOUS NETWORKS

CROSS-REFERENCED TO RELATED APPLICATION

This application is based upon and claims the benefit of priority of the European Patent Application No. 12164891.9, filed Apr. 20, 2012, the disclosure of the prior application is hereby incorporated in its entirety by reference.

FIELD OF THE INVENTION

The present invention relates to wireless communication networks, for example networks compliant with the 3GPP Long Term Evolution (LTE) and 3GPP LTE-A (LTE-Advanced) groups of standards, and more particularly to so-called heterogeneous networks (HetNets).

BACKGROUND OF THE INVENTION

Wireless communication networks are widely known in which base stations (BSs) communicate with user equipments (UEs) (also called terminals, or subscriber or mobile stations) within range of the BSs.

The geographical area covered by one or more base stations is generally referred to as a cell, and typically many BSs are provided in appropriate locations so as to form a network or system covering a wide geographical area more or less seamlessly with adjacent and/or overlapping cells. (In this specification, the terms "system" and "network" are used synonymously except where the context requires otherwise). Each BS divides its available bandwidth into individual resource allocations for the user equipments which it serves. The user equipments are generally mobile and therefore may move among the cells, prompting a need for handovers between the base stations of adjacent and/or overlapping cells. A user equipment may be in range of (i.e. able to detect signals from) several cells at the same time, and it is possible for one cell to be wholly contained within a larger cell, but in the simplest case the UE communicates with one "serving" cell.

The direction of communication from the base station to the UE is referred to as the downlink (DL), and that from the UE to the base station as the uplink (UL). Two well-known transmission modes for a wireless communication system are TDD (Time Division Duplexing), in which downlink and uplink transmissions occur on the same carrier frequency and are separated in time, and FDD (Frequency Division Duplexing) in which transmission occurs simultaneously on DL and UL using different carrier frequencies.

Resources in such a system have both a time dimension and a frequency dimension. In LTE, the resources in the time domain are organised in units of frames, each having a plurality of "subframes". Frames follow successively one immediately after the other. An FDD frame consists of 10 uplink subframes and 10 downlink subframes occurring simultaneously. An FDD frame has duration of 10 ms and each subframe a duration of 1 ms. In TDD, the 10 subframes are shared between UL and DL and various allocations of subframes to downlink and uplink are possible, depending on the load conditions. Subframes may consequently be referred to as uplink subframes or downlink subframes.

The basic system architecture in LTE is illustrated in FIG. 1. As can be seen, each UE 20 connects over a wireless link via a Uu interface to an eNodeB (eNB) 10, which defines one or a number of cells for wireless communication.

Each eNB 10 in turn is connected by a (usually) wired link using an interface called S1 to higher-level or "core network" entities, including a Serving Gateway (S-GW 22), and a Mobility Management Entity (MME 21) for managing the network and sending control signalling to other nodes, particularly eNBs, in the network. These are shown in combined form in the Figure. The links to the core network are referred to as "backhaul". The backhaul is defined as the transport network which allows connecting all network nodes together, namely each eNB to the core network entities and each eNB to its neighbour eNB if needed. Generally, backhaul is based on Internet Protocol (IP), and for femto stations only (HNBs and HeNBs), backhaul may be over existing broadband infrastructure in homes and offices In FIG. 1, the S1 interface is labelled S1-U, the suffix U denoting the user plane employed by the eNBs 10 for communicating user data to and from the S-GW 22. The S-GW is responsible for packet forwarding of user data on the downlink to the UE 20 and on the uplink. The S-GW 22 provides a "mobility anchor" for the user plane during handovers of a UE 20 from one eNB 10 to another.

In parallel to this, there is an interface S1-MME (sometimes called S1C) via which the eNBs 10 exchange control messages with the MME 21. The main function of the MME 21, as its name suggests, is to manage mobility of the UEs 20, and it is a signalling-only entity. The MME 21 is also responsible for controlling security (including authenticating users). In practice, there may be several MMEs forming a MME "pool". One eNB can have several S1-MME interfaces towards several MMEs.

In addition, as shown in FIG. 1, the eNBs 10 communicate among themselves by a (usually) wireless link, using an interface called X2 for mutual co-ordination, for example when handing over a UE 20 from one eNB to another. There is only one X2 interface between two eNBs. The application layer signalling protocol is referred to as X2AP.

Several "channels" for data and signalling are defined at various levels of abstraction within the network. FIG. 2 shows some of the channels defined in LTE at each of a logical level, transport layer level and physical layer level, and the mappings between them.

At the physical layer level, on the downlink, user data as well as System Information Blocks (SIBs) are contained in a transport channel DL-SCH, carried on the Physical Downlink Shared Channel (PDSCH). As can be seen from FIG. 2, PDSCH also carries a paging channel PCH at the transport layer level. There are various control channels on the downlink, which carry signalling for various purposes; in particular the Physical Downlink Control Channel, PDCCH, is used to carry, for example, scheduling information from a base station (called eNB in LTE) to individual UEs being served by that base station. The PDCCH is located in the first OFDM symbols of a slot.

Each base station broadcasts a number of channels and signals to all UEs within range, whether or not the UE is currently being served by that cell. Of particular interest for present purposes, these include a Physical Broadcast Channel PBCH as shown in FIG. 3, as well as (not shown) a Primary Synchronization Signal PSS and Secondary Synchronization Signal SSS. PBCH carries a so-called Master Information Block (MIB), which gives, to any UEs within range of the signal, basic information including system bandwidth, number of transmit antenna ports, and system frame number. Reading the MIB enables the UE to receive and decode the SIBs referred to earlier.

Meanwhile, on the uplink, user data and also some signalling data is carried on the Physical Uplink Shared Channel (PUSCH), and control channels include a Physical Uplink Control Channel, PUCCH, used to carry signalling from UEs including channel quality indication (CQI) reports and scheduling requests.

The Physical Random Access Channel PRACH is used to carry the Random Access Channel (RACH) for accessing the network if the UE does not have any allocated uplink transmission resource. If a scheduling request (SR) is triggered at the UE, for example by arrival of data for transmission on PUSCH, when no PUSCH resources have been allocated to the UE, the SR is transmitted on a dedicated resource for this purpose. If no such resources have been allocated to the UE, the RA procedure is initiated. The transmission of SR is effectively a request for uplink radio resource on the PUSCH for data transmission.

Thus, RACH is provided to enable UEs to transmit signals in the uplink without having any dedicated resources available, such that more than one terminal can transmit in the same PRACH resources simultaneously. The term "Random Access" (RA) is used because (except in the case of contention-free RACH, described below) the identity of the UE (or UEs) using the resources at any given time is not known in advance by the network. Preambles (which when transmitted, produce a signal with a signatures which can be identified by the eNB) are employed by the UEs to allow the eNB to distinguish between different sources of transmission.

Situations where the RACH process is used include:
Initial access from RRC_IDLE
RRC connection re-establishment
Handover
DL data arrival in RRC_CONNECTED (when non-synchronised)
UL data arrival in RRC_CONNECTED (when non-synchronised, or no SR resources are available)
Positioning (based on Timing Advance)

RACH can be used by the UEs in either of contention-based and contention-free modes. In contention-based RA, UEs select any preamble at random, at the risk of "collision" at the eNB if two or more UEs accidentally select the same preamble. Contention-free RA avoids collision by the eNB informing each UE which preambles may be used.

The RA procedure can be triggered in response to a PDCCH order (e.g. for DL data arrival, or positioning). Contention free RA in Release-8/9/10 is only applicable for handover, DL data arrival and positioning.

Referring to FIG. 3, the RA procedure typically operates as follows (for contention based access):—

(i) As already mentioned the UE 20 receives the downlink broadcast channel PBCH for the cell of interest (serving cell). This is indicated by (0) in the Figure.

(ii) The network, represented in FIG. 3 by eNB 10, indicates cell specific information including the following:
resources available for PRACH
Random Access Preambles (henceforth, "preambles") available (up to 64)
preambles corresponding to small and large message sizes.

(iii) The UE 20 selects a PRACH preamble according to those available for contention based access and the intended message size.

(iv) The UE 20 transmits the PRACH preamble (also called "Message 1", indicated by (1) in the Figure) on the uplink of the serving cell. The network (more particularly the eNB 20 of the serving cell) receives Message 1 and estimates the transmission timing of the UE.

(v) The UE 20 monitors a specified downlink channel for a response from the network (in other words from the eNB 10). The UE monitors this channel for a specified length of time, the RAR window shown in the Figure. In response to the UE's transmission of Message 1, the UE receives a Random Access Response or RAR ("Message 2" indicated by (2) in FIG. 3) from the network. This is described in more detail below.

(vi) In response to receiving Message 2 from the network, the UE 20 makes a scheduled transmission on PUSCH ("Message 3" as indicated by (3) in the Figure) using the UL grant and TA information contained in Message 2.

(vii) A contention resolution message may be sent from the network (in this case from the eNB 10) in the event that the eNB received the same preamble simultaneously from more than one UE, and more than one of these UEs transmitted Message 3.

If the UE 20 does not receive any response from the eNB, the UE selects a new preamble and sends a new transmission in a RACH subframe after a random back-off time.

For contention-free RA, the procedure is simpler:
(i) The eNB configures the UE with a preamble from those available for contention-free access.
(ii) The UE transmits the preamble (Message 1) on the uplink of the serving cell.
(iii) The UE receives the RAR (Message 2) via PDSCH from the network, which contains an UL grant for transmission on PUSCH. The resource to be used for RAR is again signalled on PDCCH using CSS.

In both contention-based and contention-free RA procedures, the RAR contains a Temporary Cell Radio Network Temporary Identifier (C-RNTI) which identifies the UE. The C-RNTI is used to address UL transmission to the cell by identifying the UE in later UL transmissions.

In the contention-based procedure, the UE transmits this C-RNTI back to the eNB in Message 3 and, if more than one UE does so there will be a collision at the eNB which may then initiate the contention resolution procedure.

In both contention-based and contention-free RA procedures, the RAR contains:
A Timing Advance command;
A UL Grant; and
A Temporary Cell Radio Network Temporary Identifier (C-RNTI).

At the physical layer, the 20-bit UL Grant is interpreted as the Random Access Response Grant (RARG), and contains amongst others things an indication of the UL resources and transmit power control (TPC) to be used for the forthcoming transmission on PUSCH.

The various fields of the RAR and RARG may or may not be relevant to a given RA procedure, depending on whether it is contention-based or contention-free, and depending on its purpose.

The Temporary C-RNTI becomes permanent after contention-resolution and further attempts in the contention-based RA procedure.

In order to manage, e.g., scheduling and congestion issues in the downlink, the eNB is given a window of time to send the RAR. This is the RAR window mentioned earlier and shown in FIG. 3, and is configurable from two to ten milliseconds (corresponding to two to ten subframes), depending upon the choice of system parameters. The UE is required to monitor the whole RAR window to detect if the eNB has acknowledged its preamble transmission. If no RAR is received within the RAR window then typically the RA preamble is re-transmitted.

Further details of the RA procedure in LTE are given in the document 3GPP TS 36.321, hereby incorporated by reference.

As already mentioned, cells may be overlapping or even entirely contained within a larger cell. This is particularly the case for so-called Heterogeneous Networks.

FIG. 4 schematically illustrates part of a heterogeneous network in which a macro base station 10 covers a macrocell area (indicated by the large outer ellipse), within which there are other, overlapping cells (the smaller ellipses) formed by a pico base station 12 (picocell) and femto base stations 14. As shown a UE 20 may be in communication with one or more cells simultaneously, in this example with the macro cell and the picocell. The cells may not have the same bandwidth; typically, the macro cell will have a wider bandwidth than each pico/femto cell.

Some definitions are as follows:

Heterogeneous Network: A deployment that supports a mixture of more than one of macro, pico, femto stations and/or relays in the same spectrum.

Macro base station—conventional base stations that use dedicated backhaul and open to public access. Typical transmit power ~43 dBm; antenna gain ~12-15 dBi.

Pico base station—low power base station with dedicated backhaul connection and open to public access. Typical transmit power range from ~23 dBm-30 dBm, 0-5 dBi antenna gain;

Femto base station—consumer-deployable base stations that utilize consumer's broadband connection as backhaul; femto base stations may have restricted association. Typical transmit power <23 dBm.

Relays—base stations using the same radio spectrum for backhaul and access. Similar power to a Pico base station.

In LTE, an example of a femto base station is the so-called Home eNodeB or HeNB.

The installation by network customers of base stations with a localised network coverage cell, such as femto base stations (Home eNodeBs) is expected to become widespread in future LTE deployments. A femto base station or pico base station can be installed in, for example, a building within which network subscriber stations experience high path loss in transmissions with a macro cell. Femto and pico base stations can be installed by a customer in his own premises. The femto and picocells thereby formed can improve network coverage, but for coordination among the various cells, it is preferable that they be able to exchange information with the macro cell (more precisely the MeNB 10 of FIG. 4), in some cases with other cells, and that they are synchronized with one another.

Pico eNBs and femto eNBs differ in that a pico eNB supports the X2 interface with a macro eNB, whilst a femto cell (HeNB), in current LTE specifications, does not always support the X2 interface with a macro eNB. However, since a femto cell has an S1 interface to the core network, it would be possible in principle for it to receive such exchanges over S1. The term "picocell" will henceforth be used to cover both femto and picocells, and "peNB" used to cover both a pico and femto base station.

Consider now a heterogeneous network (HetNet) in which UEs operate within the coverage of at least two cells: a macrocell to which they are presently connected and a picocell to which they may cause uplink (UL) interference. The picocell eNodeB (peNB) and macrocell eNodeB (MeNB) are able to exchange information (normally over the X2 interface), and the macrocell is able to effect handover of any macro-connected UE (MUE) to the picocell, making it a pico-connected UE (pUE).

The peNB may need to estimate the UL interference MUEs are causing so that it can provide load information to the MeNB in order to facilitate, e.g. re-scheduling of UL transmission in the macrocell or handover of certain MUEs to the picocell whence they will no longer cause interference in the picocell. It is preferred that solutions to this should not rely on tight synchronization among the layers of the network. Therefore, on the uplink, using the Random Access (RA) procedure and measuring the transmission on the Physical Random Access Channel (PRACH) are a useful solution.

It has been proposed in the above scenario that the MeNB triggers, via a PDCCH order, a contention-free RA procedure from a UE. The peNB is informed over X2 of the resources and preamble the UE will use, and the peNB can then measure the received signal and use this to estimate the interference the UE will cause when transmitting, e.g., PUSCH and PUCCH.

Following this proposal, the UE will expect the contention-free RA procedure to run to full completion, including, for example, re-transmission of the preamble or the RAR if the procedure does not complete successfully the first time. However, the peNB may be able to obtain satisfactory interference estimates without the procedure being fully complete, and there could thus be wasted transmit power, signalling, and processing effort at both the UE and eNBs, which could additionally disrupt conventional RA procedures in the macrocell by occupying resources. Furthermore, the RA procedure in LTE allows for power ramping if the preamble is not received successfully at the eNB. This is undesirable in the scenario considered here since ideally the transmission on PRACH would have a power approximately the same as typical transmission on PUSCH. Additionally, power-ramping would make it difficult to form a meaningful time-average of the interference at the peNB. Trying to use the X2 interface from the peNB to MeNB to trigger, terminate, configure, etc. a contention-free RA procedure in the macrocell according to the peNB's interference measurement needs will be too slow compared to the several millisecond timescale of the RA procedure at lower layers.

Therefore, schemes that minimise wasted procedures and associated signalling, whilst enabling suitable interference measurements at the peNB to be configured in a timely manner, are of significant interest.

SUMMARY OF THE INVENTION

According to a first aspect of the present invention, there is provided a wireless communication system comprising a terminal, a first base station and a second base station, the terminal arranged for transmission of a first signal to the first base station in accordance with a procedure;

the first base station arranged to configure the terminal with one or more characteristics of the procedure including any of:

a preamble carried by the first signal;

a particular value of an identifier in a second signal transmitted by the first base station in response to the first signal;

the timing of the second signal with respect to the first signal; and whether the timing of transmission of the first signal is determined by the base station or by the terminal;

wherein
the one or more characteristics are predefined as being capable of indicating at least one further characteristic of the procedure; and
the first base station is arranged to provide information about the procedure to a second base station.

The "procedure" referred to above may be a modified version of a procedure already defined in the wireless communication system. In particular it may include at least part of a RA procedure as provided for example in LTE. However, it is to be noted that the procedure need not be a complete RA procedure as needed for a UE to obtain uplink resources in the network. This is because, in the present invention, the purpose of the procedure is to enable the second base station to monitor the UE's transmission and thereby obtain information about likely interference caused to the second base station. Thus, for example it may be sufficient to perform the procedure as far as transmission of the preamble.

The system may be applied to a heterogeneous network in which the first base station is, for example, a macrocell base station and the second base station is a picocell base station (the term picocell also including femtocell for present purposes). Providing information from the first base station to the second base station would be performed via a suitable interface. In an LTE-based system this would normally be the X2 interface. However, in the case of a femtocell the S1 interface could be used as noted above.

The "particular value of an identifier in a second signal transmitted by the first base station in response to the first signal" can refer (at least in the case of an LTE RA procedure) to the temporary C-RNTI carried in the RAR.

The "timing of the second signal with respect to the first signal" may refer, at least in case of an LTE RA procedure, to the size of a RAR window within which the terminal should expect to receive the second signal (RAR) from the first base station. For example a window size of zero may indicate to the terminal that the procedure of the invention is to be used, rather than a conventional procedure.

It should be noted that there may not actually be a transmission of the second signal from the base station to the terminal. The term "second signal" should be taken to mean a signal which the base station may or may not transmit to the terminal, or which the first base station would normally transmit in the procedure already defined in the wireless communication system.

"Whether the timing of transmission of the first signal is determined by the base station or by the terminal" refers, at least in case of an LTE RA procedure, to the possibility of configuring the preamble by RRC, in which case the exact timing of RACH transmission is determined by the terminal, or whether the preamble is configured by PDCCH order, in which case the timing would be determined by reception of the PDCCH order itself (in other words by the first base station).

Preferably, in the above system, the second base station is arranged to monitor signals transmitted from the terminal on the basis of the information.

The procedure may be carried out once, or may be repeated a specified number of times.

Therefore, preferably, the at least one further characteristic includes any of:
an exact required number of repetitions of the first signal;
a maximum permitted number of repetitions of the first signal;
a required minimum number of repetitions of the first signal; and
a power level for transmission of the or each first signal.

Specifying the number of repetitions (which may be one) and/or the power level in the above manner can avoid wasteful signalling, as well as undesirable power ramping which would make it difficult for the second base station to form a meaningful measurement on the signals from the terminal.

As the identifier, the base station preferably configures the terminal with a reserved value of the identifier, not used to identify any terminal. This can alert the terminal to usage of the novel procedure of the invention whilst avoiding confusion with the normal purpose of the identifier.

As stated above, the one or more characteristics are predefined as being capable of indicating at least one further characteristic of the procedure. However, it may be wished to confirm actual use of the one or more characteristics for the purposes of the present invention. The first base station may therefore be further arranged to provide a notification to the terminal of use of the one or more characteristics for indicating the at least one further characteristic of the procedure.

In certain embodiments, the notification is made indirectly, by a predefined combination of values contained in the second signal, namely, the response from the base station to the terminal.

In other embodiments the notification is made directly, by a specific indication contained in the second signal.

It may be desirable for the first base station to trigger the procedure, so as to allow the second base station to make measurements on the monitored signals. Consequently, the first base station may be arranged to initiate the procedure by sending a command to the terminal. In this case, transmission of the command at a pre-arranged timing, or transmission of the command with a specific indication, provides the notification to the terminal of use of the one or more characteristics for indicating at least one other characteristic of the procedure.

One of the possible characteristics mentioned above is the timing for the second signal from the base station to the terminal. Preferably, this timing is indicated by a configured response window and a specific value of this window is predefined as terminating the procedure. For example, a zero value of the response window would not be otherwise useful, and would be suitable for this purpose.

The procedure may be repeated in order to ensure that the second base station can make sufficient measurements. Thus, preferably, the first base station is arranged to perform first and second executions (repetitions) of the procedure with the terminal, the first base station configuring the terminal with different identifiers at each execution, the terminal arranged to infer at least one other characteristic from the combination of the identifiers.

It should be noted that, in the case of a RA procedure, a complete end-to-end procedure need not be executed; it is sufficient to perform transmission of the preamble.

In one embodiment the procedure, for which the first base station is arranged to configure the terminal with one or more characteristics, is preceded by a prior procedure, the first base station configuring the terminal with the one or more characteristics by sending a response as part of the prior procedure.

In a preferred form of the above embodiments, the procedure is a random access procedure. In this case, the information provided by the first base station to the second base station may include indication of resource which the first base station has made available for the random access procedure.

More particularly the procedure may be either a contention-free or a contention-based random access procedure and the prior procedure referred to earlier (if any) may be a contention-based random access procedure. This allows the procedure of the invention to be applied to contention-based random access, which is triggered by the terminal rather than by the first base station.

According to a fourth aspect of the present invention, there is provided a wireless communication method comprising:
  defining a procedure including transmission of a first signal from a terminal to a first base station;
  the first base station configuring the terminal with one or more characteristics of the procedure including any of:
    a preamble carried by the first signal;
    a particular value of an identifier in a second signal transmitted by the first base station In response to the first signal;
    the timing of the second signal with respect to the first signal; and
    whether the timing of the transmission of the first signal is determined by the terminal or by the first base station;
wherein
  the one or more characteristics are predefined as being capable of indicating at least one further characteristic of the procedure;
  the first base station provides information about the procedure to a second base station.

This allows the second base station to monitor signals transmitted from the terminal on the basis of the information.

A further aspect relates to software for allowing wireless transceiver equipment equipped with a processor to provide the terminal or the base station as defined above. Such software may be recorded on a computer-readable medium.

Throughout this section and the claims, the term "cell" is intended also to include sub-cells, and may also refer to the base station (eNB) of the cell concerned.

In general, and unless there is a clear intention to the contrary, features described with respect to one embodiment of the invention may be applied equally and in any combination to any other embodiment, even if such a combination is not explicitly mentioned or described herein.

As is evident from the foregoing, the present invention involves signal transmissions between base stations and user equipments in a wireless communication system. A base station may take any form suitable for transmitting and receiving such signals. It is envisaged that the base stations will typically take the form proposed for implementation in the 3GPP LTE and 3GPP LTE-A groups of standards, and may therefore be described as an eNodeB (eNB) (which term also embraces Home eNodeB or Home eNodeB) as appropriate in different situations. However, subject to the functional requirements of the invention, some or all base stations may take any other form suitable for transmitting and receiving signals from user equipments.

Similarly, in the present invention, each user equipment may take any form suitable for transmitting and receiving signals from base stations. For example, the user equipment may take the form of a subscriber station, or a mobile station (MS), or any other suitable fixed-position or movable form. For the purpose of visualising the invention, it may be convenient to imagine the user equipment as a mobile handset (and in many instances at least some of the user equipments will comprise mobile handsets), however no limitation whatsoever is to be implied from this.

Embodiments of the present invention can enhance the RA procedure such that it is suitable for making measurements of UL interference in a heterogeneous network (HetNet) scenario. The RA procedure triggered in a macrocell produces UE transmissions on PRACH, which a picocell eNB can attempt to make measurements of for interference coordination purposes over a suitable interface between the macro eNB and the pico eNB. Embodiments of the present invention allow dynamic reconfiguration of the UE's behaviour during principally the contention-free RA procedure such that its transmissions on PRACH are different to the default and are made suitable for HetNet interference measurements. This is done by assigning new meanings to certain of the characteristic parameters provided by the macro eNB to a UE, such as the RA preamble it uses and the C-RNTI it is assigned during the procedure. Interpreting these new meanings allows the UE to temporarily reconfigure its PRACH transmissions so as to be useful to the pico eNB's interference measurement needs without disrupting the UE's existing configuration within the macrocell and without the UE needing to know the purpose of its transmissions.

BRIEF DESCRIPTION OF THE DRAWINGS

Reference is made, by way of example only, to the accompanying drawings in which.

DETAILED DESCRIPTION

As will be explained, embodiments of the present invention assign to certain characteristics of the contention-free RA procedure an implicit meaning such that a UE detecting them knows that it should interpret the RA procedure in a way such that its behaviour is suitable for the peNB to conduct UL interference measurements. Such behaviours may be so as to reduce excess signalling, control transmit power, or to assume that its final state is not so as to be expecting DL transmissions or handover. The proposals to date in this area do not assign any implicit meaning to these characteristics of the contention-free RA procedure, and so there is only one behaviour that a UE will assume it must adhere to. The new implicit meanings for parts of the contention-free RA procedure may be provided in specifications, or by broadcast signalling within a cell.

Some aspects of the invention can further be applied to the contention-based RA procedure, allowing for alteration or continuation of such a procedure after it is begun, thus enabling serendipitous UL interference measurements in the picocell if other matters, notably timing, permit.

Figure 1:
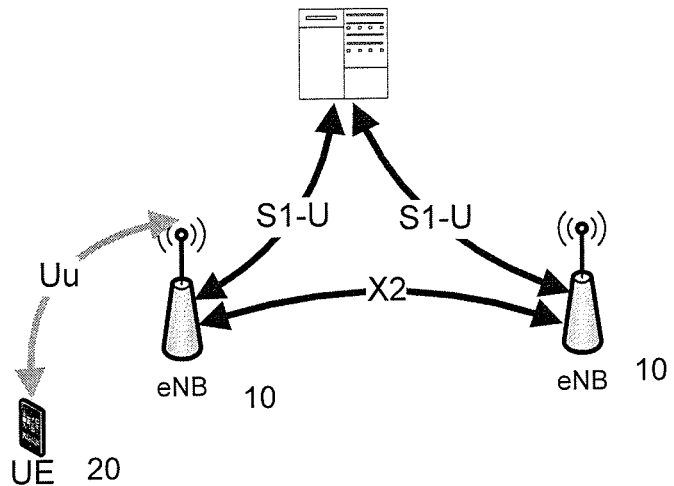
FIG. 1 illustrates a network topology in LTE.
Figure 2:
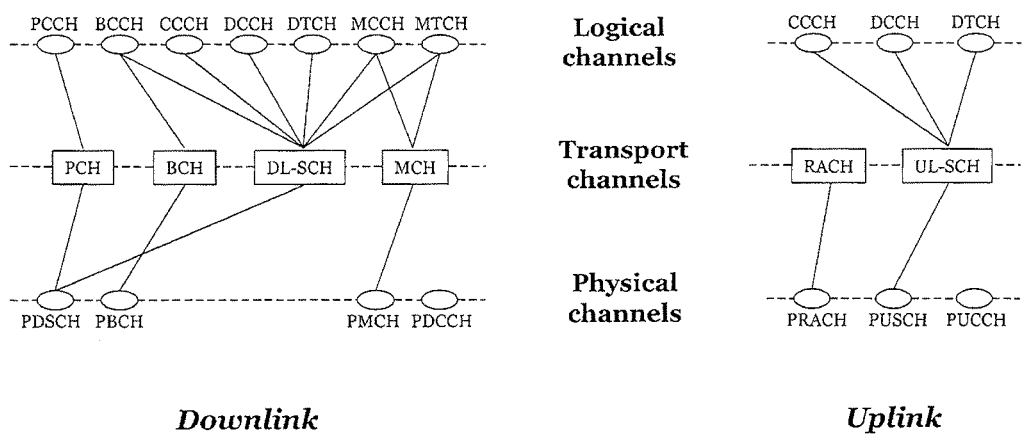
FIG. 2 shows the mapping between logical channels, transport channels and physical channels in LTE.
Figure 3:
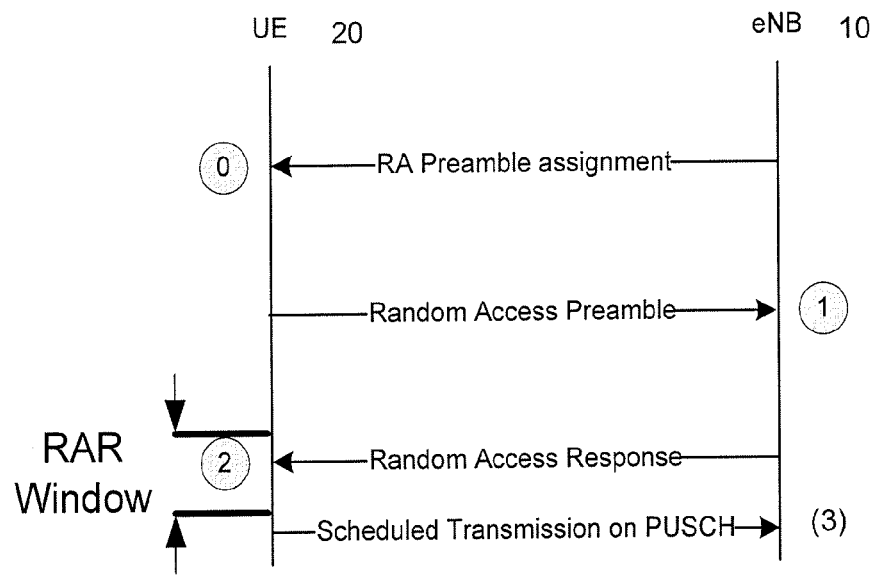
FIG. 3 shows a conventional RA procedure in an LTE system.
Figure 4:
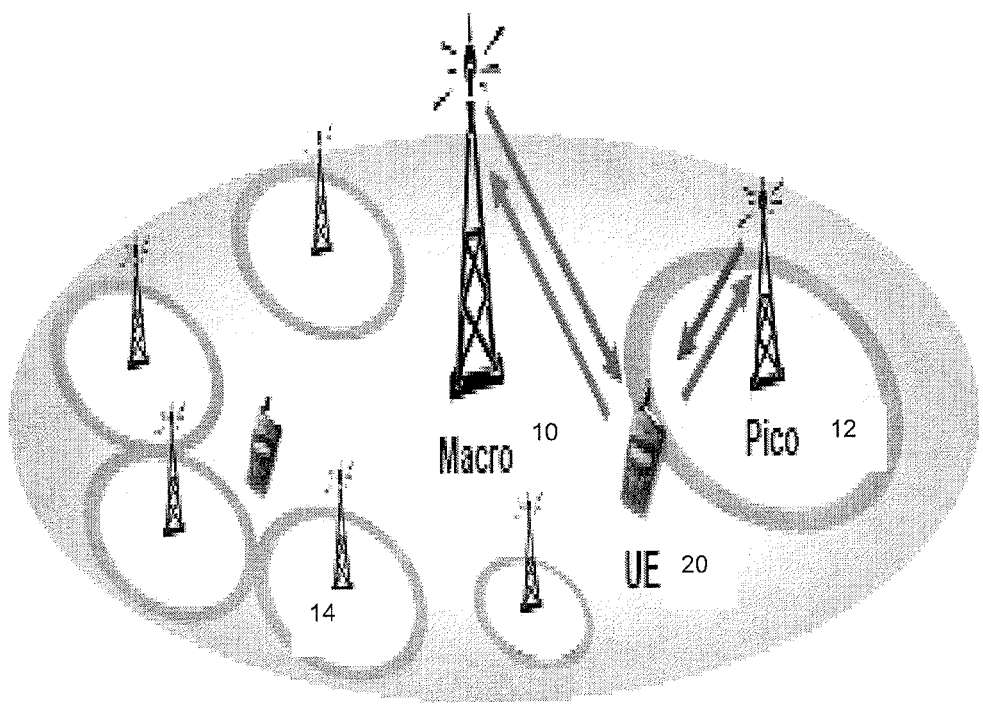
FIG. 4 schematically illustrates a heterogeneous network in which a macro cell, pico and femto cells are overlapping.
Figure 5:
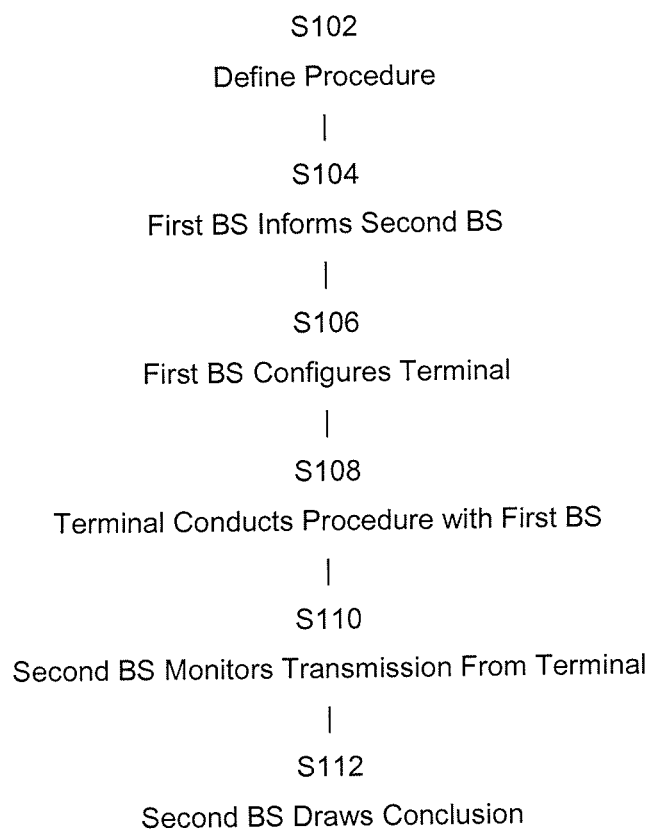
FIG. 5 is a flowchart of the main steps involved in a method embodying the invention.

FIG. 5 outlines a process embodying the present invention, where "first base station" represents, for example, a MeNB base station and "second base station" represents, for example, a peNB base station.

In an initial step S102, before actual operation of the network, a procedure is defined including transmission of a signal from a terminal to a first base station. This could be, for example, a RA procedure as described below.

In a later step S104 at some point during operation of the network, the first base station provides information about the procedure to a second base station. This would normally be done via the X2 interface. In the case of the second base station being a femtocell base station, the communication could be through the S1 interface.

In addition (step S106), the first base station configures the terminal with one or more characteristics of the procedure as explained below with respect to various embodiments. After that, and not necessarily immediately (step S108), the terminal conducts the procedure with the first base station, including transmitting the signal.

Meanwhile (step S110) the second base station monitors signals transmitted from the terminal on the basis of the information.

Finally, (step S112) the second base station draws some conclusion from the results of monitoring. For example it may derive an interference measurement from the signal transmitted from the terminal.

The procedure may involve more than one transmission from the terminal, and/or the procedure may be repeated as many times as required. Thus, steps S108 and S110 may be repeated until the second base station has sufficient measurements from which to draw a conclusion.

In general, unless otherwise indicated, the embodiments described below are based on LTE, where the network operates using FDD and comprises one or more eNBs, each controlling one or more downlink cells, each downlink cell having a corresponding uplink cell. Each DL cell may serve one or more terminals (UEs) which may receive and decode signals transmitted in that serving cell. In order to control the use of transmission resources in time, frequency and spatial domains for transmission to and from the UEs, the eNB sends control channel messages (PDCCH) to the UEs. A PDCCH message typically indicates whether the data transmission will be in the uplink (using PUSCH) or downlink (using PDSCH), it also indicates the transmission resources, and other information such as transmission mode, number of antenna ports, data rate, number of codewords enabled, etc. In addition PDCCH may indicate which reference signals may be used to derive phase reference(s) for demodulation of a DL transmission. PDCCH may also be used to send a 'PDCCH order' to a UE to instruct it to conduct a contention-free RA procedure.

Initial access to the system by a UE is carried out using the RA procedure explained above, where the UE transmits a RA preamble using one of the available signatures. The case where UE may be configured to have two or more serving cells at the same carrier frequency is not excluded.

In the embodiments, references to "the RA procedure" refer to the contention-free RA procedure, absent a clear intention otherwise; and references to "the preamble" are to the preamble with which the UE is configured by the network in its PDCCH order.

Configuration by RA Preamble Reservation

In a first embodiment, at least one among the RA preambles reserved in the macrocell for contention-free RA is designated as indicating:

The exact number of repetitions of the RA procedure the UE is to conduct; or

The maximum number of repetitions of the RA procedure the UE may conduct, terminating after the first successful procedure; or The minimum number of repetitions of the RA procedure the UE must conduct even if the procedure is successful, no further repetitions being conducted after the first successful RA procedure upon or after the given minimum number;

and may indicate, if not configured by other means such as RRC signalling:

The frequency/time domain resources to be used for transmission of the RA preamble;

The power with which the UE shall transmit the RA preamble in each repetition of the RA procedure.

In variations of this embodiment, such power may be unequal or equal between the repetitions. In the latter case the power may be indicated with a single value for all repetitions, or the same value indicated separately for each repetition. The power may be expressed as an absolute power level, or by reference to the measured power of a downlink transmission (as in the RA procedure currently defined for LTE), or relative to the power level of a UL signal transmitted by the UE.

A UE being configured by the MeNB with such a preamble executes the contention-free RA procedure, but modified according to which preamble it is configured with.

Before commencing the contention-free RA procedure in the macrocell in accordance with this embodiment, the MeNB exchanges the relevant information with the peNB over their X2AP interface. The relevant information includes the same information as is indicated to the UE by the MeNB's choice of RA preamble (or, for example, by the preamble itself if the peNB has knowledge of the reserved preambles and their meanings), as well as items known to the prior art, such as information regarding the resources for PRACH and preambles in use in the macrocell.

Such an exchange of information will be familiar to those skilled in the art. For example, some new information elements (IEs) can be defined for the X2 interface between MeNB and peNB which carry such information as the preamble, power levels, PRACH resource configuration, and any other necessary information.

Configuration by C-RNTI Reservation

The second embodiment is like the first, except that at least one C-RNTI not currently assigned to a UE is reserved in the macrocell as indicating the parameters discussed in the first embodiment. A UE receiving such a reserved C-RNTI in the RAR continues with the contention-free RA procedure, but modified according to which C-RNTI it has received. In this case, there need be no reservation among the RA preambles, and the UE only discovers that modifications to its RA procedure are required upon decoding the RAR. The C-RNTI received in this embodiment would, following prior art, be the same as the C-RNTI the UE would necessarily already have. But in this embodiment, the C-RNTI sent according to the invention is different to the UE's existing C-RNTI. By virtue of it being among the reserved values, the UE can treat it as not replacing the existing value, and can discard it upon the conclusion of the modified RA procedure.

It is thus a necessary feature of this embodiment that there be at least one C-RNTI which is reserved and which is not currently in use. The range of C-RNTI is 0x0001 to 0xFFF3 (excluding any RA-RNTI values valid within the cell), or in other words 65523 possible values, so this should not be a restriction.

In a variation, the nine reserved values of RNTI in 3GPP TS 36.321, Section 7.1 could be used for the purposes of this embodiment. In this case, the UE would be able to recognise that it had received a reserved value as its C-RNTI in a given RA procedure and thus infer the modification(s) to its behaviour without altering the C-RNTI it was previously assigned. This would remove any restrictions on which C-RNTIs valid in Release 8/9/10 can be assigned to UEs, but would restrict the parameters to nine possible states.

Configuration Via C-RNTI or RA Preamble with Purpose Indication in RAR Grant

In a third embodiment, the UL Grant field in the RAR (interpreted as the Random Access Response Grant (RARG) at the physical layer) is used to indicate that this invention is operation. This could be done by setting the fixed-size resource block assignment to zero (so there will be no scheduled PUSCH transmission) but coupling this with a PUSCH TPC command not equal to zero; this could be any non-zero value or a specified non-zero value. Since there is no PUSCH transmission scheduled, the UE does not actually make use of the TPC command, and this can simply be discarded in the same way as in the second embodiment.

In this embodiment, such a combination signals to the UE that the C-RNTI contained in the RAR should be interpreted in the manner of the second embodiment, i.e. that it implies a particular behaviour, as in the first embodiment, for any continuation of the contention-free RA procedure. A UE not receiving such a combination in the RARG makes no particular interpretation of the C-RNTI it receives.

Here, a combination of values is adopted since all values of TPC and all values of resource block assignment already have meanings, so only an identifiable combination of these parameters can be given some new meaning.

In a variation, the combination of fields (e.g. zero-RB and TPC value) in the RARG indicates retrospectively that the UE should interpret the preamble it was configured with according to the first embodiment. This may imply further repetitions of the RA procedure according to possibly different settings than the UE used in the procedure which has already completed or, depending on the configuration it may imply no further action. Such an arrangement may be useful if prior configuration of the UE is not possible for any reason, or as an alternative way to implement the principle of the invention without making any changes to the system specification.

Configuration Via C-RNTI or RA Preamble with Extended RAR

A fourth embodiment is like the third, but instead of using a combination of parameters in the RARG, an additional bit is added to the RAR as currently specified and used to indicate specifically if the invention is in operation and thus whether the UE is expected to make the relevant interpretation of the C-RNTI.

In a variation, the bit-setting described above indicates retrospectively that the UE should interpret the preamble it was configured with according to the first embodiment. This may imply further repetitions of the RA procedure according to possibly different settings than the UE used in the procedure which has already completed or, depending on the configuration it may imply not further action.

Configuration Via RAR Window

In a fifth embodiment, the contention-free RA procedure is altered such that the size of the RAR window is set to zero and defined to imply that there is to be: (i) no expectation of receiving RAR and therefore (ii) no scheduled transmission on the UL following the RA procedure, and (iii) even if the procedure does not complete successfully, there are to be no further transmissions of the RA preamble. It should be noted that, conventionally, a RAR window size of zero is not permitted and UE behaviour in this case is therefore not defined.

To explain further, in current LTE specifications the RAR window size is defined as {sf2, sf3, sf4, sf5, sf6, sf7, sf8, sf10} where "sf" represents a value in subframes (which as already mentioned are each 1 millisecond long). Thus, sf2 corresponds to 2 subframes/2 ms, sf3 means 3 subframes/3 ms and so on. The zero RAR window in this embodiment would need to be defined in the specifications.

Operation of this embodiment can be notified to the UE by the same means as mentioned elsewhere, for example through SIBs. In this way the UE can be restricted to a single execution of the RA procedure, regardless of what happens during the procedure. If the peNB is not able to take sufficient measurements during this single execution, it will need to send a request (usually via X2 but possibly via S1) for the MeNB to repeat the procedure.

In terms of the parameters considered in the first embodiment, this implies exactly one use of the RA procedure with a certain power level.

Configuration by PDCCH Order Subframe

PDCCH is transmitted every subframe by the MeNB, but only includes an order to perform a RA procedure when this is necessary. In a sixth embodiment, at least one particular subframe is defined such that the MeNB sending the PDCCH order in such a subframe indicates to the UE that the new RA procedure as described in earlier embodiments is to be used.

Configuration by PDCCH Order Contents

In a seventh embodiment, the use of the new RA procedure is signalled in the PDCCH order, e.g. by adding one or more new bits to it. The UE can then interpret the preamble or C-RNTI according to relevant embodiments. Such new bits could be used to indicate also or alternatively the parameters discussed in the first embodiment.

In a variation on this embodiment, a new bit can be used to indicate that no RARs will be sent. This reduces signalling and transmission power. The UE then proceeds to repeat transmission of the RA preamble according to the first embodiment, with the configuration of the parameters by the choice of preamble and/or by the new bits in the PDCCH order in this embodiment.

In this way, it is possible to instruct the UE directly to execute a RA procedure in accordance with the invention, without having to use the indirect signalling methods discussed above.

Re-Configuration Via Differential or Sequential C-RNTIs

In this eighth embodiment, in a second or subsequent execution of the RA procedure according to previous embodiments, the RAR contains a C-RNTI different to that sent in the previous RAR. Then, the difference between the C-RNTI received in the present RAR and that received in the previous RAR indicates some change to the parameters discussed in the first embodiment, including possibly the cancellation of further RA procedures previously configured. In variations, a sequence of C-RNTIs over several repetitions of the RA procedure indicates an alteration to the configuration; or the sequence of C-RNTIs received in particular indicated repetitions of the RA procedure signal such an alteration.

This embodiment is useful primarily in the case that the UL scheduling needs in the macrocell change suddenly so that the MeNB wishes to suppress some pending interference-measurement PRACH transmissions.

Note that in each case the UE can discard the C-RNTI after the conclusion of each repetition of the RA procedure as set out in the second embodiment.

Contention-Based RA Procedure for Opportunistic Interference Measurements

In a ninth embodiment, the principles of especially the second, third, fourth, fifth and eighth embodiments are used to extend the capability of the contention-based RA procedure. A UE executing a contention-based RA procedure receives the C-RNTI and RAR (containing the RARG) these implying or containing the instructions to repeat the procedure as described in relevant embodiments, even if the contention-based procedure completes successfully at the first attempt. This need not disrupt the usual purpose of contention-based random access and DL and UL transmissions can follow it in the usual way.

In the preceding embodiments, the contention-free RA procedure is used and it is therefore possible (based on information from the MeNB) for the peNB to know when to expect a transmission from the UE. In the case of the contention-based procedure the peNB does not know when to expect the UE's transmission; however, a peNB which has been given information by the MeNB on the macrocell's PRACH resources can monitor all such resources for RA preamble transmissions and attempt to measure them as and when they occur. This could allow the peNB to obtain serendipitous estimates of PUSCH/PUCCH interference from a UE; this may be useful for example in the case that the peNB is not yet aware of a UE which has recently entered the area from which it could interfere with the picocell.

Various modifications are possible within the scope of the present invention.

The invention has been described with reference to LTE FDD, but could also be applied for LTE TDD, and to other communication systems such as UMTS.

Prior to the MeNB sending the PDCCH order, the peNB may need to be informed by the MeNB of at least some of the RA parameters with which the UE will be configured, so that the peNB can make the desired UL interference measurements. The methods for this will be apparent to the skilled person, and might typically use the X2 interface, except in the case of a femtocell in which case S1 could be used. Upon conclusion of the interference measurements, there could be further exchanges between the peNB and MeNB to inform the MeNB of the UL interference the peNB has measured. Again, the skilled person will be aware of available techniques for this exchange.

The new implicit meanings for parts of the contention-free RA procedure may be provided in specifications, or by broadcast signalling within a cell e.g. in SIBs. Another possibility for signalling the implicit meanings is through specific combinations of subframes and synchronization signals, as is done in the applicant's co-pending application PCT/EP2012/051452. Alternatively, they could be signalled per-UE via RRC in advance of the PDCCH order initiating the contention-free RA procedure.

The embodiments may be combined as appropriate. For example, the first and second embodiments may be combined such that the joint choice of RA preamble and C-RNTI implies the relevant parameters, thus creating more possible states that can be signalled. In general, not all preambles or C-RNTIs need be included in the reservation list with designated meanings. A UE receiving a non-reserved preamble or C-RNTI simply follows the contention-free RA procedure without modification.

The invention is backwards compatible to the extent that a UE receiving a PDCCH order will always conduct the RA procedure, whether or not it should understand something specific about it in advance. A legacy UE would not be able to alter its power level or adopt a particular repetition configuration, and the network would not be able to configure the desired UL interference behaviour, but the invention would not disrupt the behaviour of the UE any more than a conventional contention-free RA procedure would.

To summarise, embodiments of the present invention can enhance the RA procedure such that it is suitable for making measurements of UL interference in a heterogeneous network (HetNet) scenario. The RA procedure triggered in a macrocell produces transmissions on PRACH, which a picocell eNB can attempt to make measurements of for interference coordination purposes over a suitable interface between the macro eNB and the pico eNB. Embodiments of the present invention allow dynamic reconfiguration of the UE's behaviour during principally the contention-free RA procedure such that its transmissions on PRACH are different to the default and are made suitable for HetNet interference measurements. This is done by assigning new meanings to certain of the characteristic parameters provided by the macro eNB to a UE, such as the RA preamble it uses and the C-RNTI it is assigned during the procedure. Interpreting these new meanings allows the UE to temporarily reconfigure its PRACH transmissions so as to be useful to the pico eNB's interference measurement needs without disrupting the UE's existing configuration within the macrocell and without the UE needing to know the purpose of its transmissions.

In any of the aspects or embodiments of the invention described above, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein.

A computer program embodying the invention may be stored on a computer-readable medium, or it may, for example, be in the form of a signal such as a downloadable data signal provided from an Internet website, or it may be in any other form.

INDUSTRIAL APPLICABILITY

If the contention-free RA procedure is used for interference measurements in the picocell in the manner known to prior art, it may produce transmissions which do not give a useful measurement of the interference the UE is likely to cause in the picocell when it transmits on PUSCH. If, for example, the procedure is immediately successful, the picocell will have no possibility to take a time-averaged measurement of likely interference. On the other hand, since the UE will assume that the RA procedure must run to conclusion if it is unsuccessful (due to reception failure), there could be unnecessary repetitions of the procedure if the pico eNB is likely to have made sufficiently-good estimates of interference from the PRACH signals that were already transmitted. Adding similar capability to the contention-based (i.e untriggered) RA procedure could allow serendipitous measurements of UL interference in the picocell. The invention therefore adds new signalling capability to the RA procedure so that the UE can be dynamically reconfigured to temporarily use the RA procedure in a manner different to the default such that it is suitable for HetNet interference coordination measurements with reduced or eliminated excess signalling, transmit power and resource usage compared to techniques in the prior art.

The invention claimed is:

1. A wireless communication system comprising a terminal, a first base station and a second base station, the terminal arranged to transmit a first signal to the first base station in accordance with a procedure, the first base station arranged to configure the terminal with one or more characteristics of the procedure including any of:
 a preamble carried by the first signal;
 a particular value of an identifier in a second signal transmitted by the first base station in response to the first signal;
 timing of the second signal with respect to the first signal; and
 whether the timing of the transmission of the first signal is determined by the terminal or by the first base station;

the first base station arranged to provide information about the procedure to the second base station; and the second base station arranged to monitor signals transmitted from the terminal on the basis of the information;

wherein:

the one or more characteristics are predefined as being capable of facilitating interference coordination between the first and second base stations by indicating at least one further characteristic of the procedure which makes the first signal suitable for measurement by the second base station; and the first base station is further arranged to confirm actual use of the one or more characteristics for facilitating interference coordination by providing a notification of such use to the terminal.

2. The wireless communication system according to claim 1, wherein the at least one further characteristic includes any of:
 an exact required number of repetitions of the first signal;
 a maximum permitted number of repetitions of the first signal;
 a required minimum number of repetitions of the first signal; and
 a power level for transmission of each first signal.

3. The wireless communication system according to claim 1, wherein the value of the identifier is reserved and not used to identify any terminal.

4. The wireless communication system according to claim 1 wherein the notification is made indirectly, by a predefined combination of values contained in the second signal.

5. The wireless communication system according to claim 1 wherein the notification is made directly, by a specific indication contained in the second signal.

6. The wireless communication system according to claim 1, wherein the first base station is arranged to initiate the procedure by sending a command to the terminal, and wherein transmission of the command at a pre-arranged timing, or transmission of the command with a specific indication, provides a notification to the terminal of use of the one or more characteristics for indicating at least one other characteristic of the procedure.

7. The wireless communication system according to claim 1, wherein the timing for the second signal is indicated by a configured response window and a specific value of this window is predefined as terminating the procedure.

8. The wireless communication system according to claim 1, wherein the first base station is arranged to perform first and second executions of the procedure with the terminal, the first base station configuring the terminal with different identifiers at each execution, the terminal arranged to infer at least one other characteristic from the combination of the identifiers.

9. The wireless communication system according to claim 1, wherein the procedure, for which the first base station is arranged to configure the terminal with one or more characteristics, is preceded by a prior procedure, the first base station configuring the terminal with the one or more characteristics by sending a response within the prior procedure.

10. The wireless communication system according to claim 1, wherein the procedure is a random access procedure.

11. The wireless communication system according to claim 10 wherein the information, provided by the first base station to the second base station, includes indication of resource which the first base station has made available for the random access procedure.

12. A first base station in a wireless communication system comprising a terminal, the first base station and a second base station, the first base station arranged to receive a first signal transmitted from the terminal in accordance with a procedure, the first base station arranged to configure the terminal with one or more characteristics of the procedure including any of:
 a preamble carried by the first signal;
 a particular value of an identifier in a second signal transmitted by the first base station in response to the first signal;
 the timing of the second signal with respect to the first signal; and
 whether the timing of the transmission of the first signal is determined by the terminal or by the first base station; and the first base station arranged to provide information about the procedure to the second base station, wherein:

the second base station is further arranged to monitor signals transmitted from the terminal based on the information;

the one or more characteristics are predefined as being capable of facilitating interference coordination between the first and second base stations by indicating at least one further characteristic of the procedure which makes the first signal suitable for measurement by the second base station; and the first base station is further arranged to confirm actual use of the one or more characteristics for facilitating interference coordination by providing a notification of such use to the terminal.

13. A terminal in a wireless communication system comprising the terminal, a first base station and a second base station, the terminal arranged to transmit a first signal to the first base station in accordance with a procedure, and the terminal arranged to be configured by the first base station with one or more characteristics of the procedure including any of:
 a preamble carried by the first signal;
 a particular value of an identifier in a second signal transmitted by the first base station in response to the first signal;
 timing of the second signal with respect to the first signal; and
 whether the timing of the transmission of the first signal is determined by the terminal or by the first base station, wherein:
the first base station is configured to provide information on the procedure to the second base station;
the second base station is configured to monitor signals transmitted from the terminal based on the information;
the one or more characteristics are predefined as being capable of facilitating interference coordination between the first and second base stations by indicating at least one further characteristic of the procedure which makes the first signal suitable for measurement by the second base station; and
the terminal is further arranged to receive from the first base station a notification confirming actual use of the one or more characteristics for facilitating interference coordination.

14. A wireless communication method comprising:
defining a procedure including transmission of a first signal from a terminal to a first base station;
the first base station configuring the terminal with one or more characteristics of the procedure including any of:
a preamble carried by the first signal;
a particular value of an identifier in a second signal transmitted by the first base station in response to the first signal;
the timing of the second signal with respect to the first signal; and
whether the timing of the transmission of the first signal is determined by the terminal or by the first base station; and
wherein:
the first base station is configured to provide information about the procedure to a second base station;
a second base station is configured to monitor signals transmitted from the terminal based on the information;
the one or more characteristics are predefined as being capable of facilitating interference coordination between the first and second base stations by indicating at least one further characteristic of the procedure which makes the first signal suitable for measurement by the second base station; and
the first base station confirms actual use of the one or more characteristics for facilitating interference coordination by providing a notification of such use to the terminal.

* * * * *